(12) United States Patent
Ahmed (10) Patent No.: US 10,877,175 B2
(45) Date of Patent: Dec. 29, 2020

(54) SEISMIC ACQUISITION GEOMETRY FULL-WAVEFORM INVERSION

(71) Applicant: BP Corporation North America Inc., Houston, TX (US)

(72) Inventor: Imitaz Ahmed, Katy, TX (US)

(73) Assignee: BP Corporation North America inc., Houston, TX (US)

( * ) Notice: Subject to any disclaimer, the term of this patent is extended or adjusted under 35 U.S.C. 154(b) by 379 days.

(21) Appl. No.: 15/830,643

(22) Filed: Dec. 4, 2017

(65) Prior Publication Data

US 2018/0156933 A1 Jun. 7, 2018

Related U.S. Application Data

(60) Provisional application No. 62/429,569, filed on Dec. 2, 2016.

(51) Int. Cl.
| | | |
|---|---|---|
| *G01V 1/30* | (2006.01) | |
| *G06T 7/55* | (2017.01) | |
| *G01V 1/00* | (2006.01) | |
| *G01V 1/28* | (2006.01) | |
| *G01V 1/34* | (2006.01) | |
| *G01V 1/38* | (2006.01) | |

(52) U.S. Cl.
CPC .............. *G01V 1/306* (2013.01); *G01V 1/005* (2013.01); *G01V 1/282* (2013.01); *G01V 1/303* (2013.01); *G01V 1/345* (2013.01); *G01V 1/3808* (2013.01); *G06T 7/55* (2017.01); *G01V 1/301* (2013.01); *G01V 1/307* (2013.01); *G01V 2210/51* (2013.01); *G01V 2210/614* (2013.01); *G01V 2210/6222* (2013.01); *G01V 2210/679* (2013.01)

(58) Field of Classification Search
CPC .. G01V 1/282; G01V 2210/614; G01V 1/345; G01V 2210/67; G06T 7/55
See application file for complete search history.

(56) References Cited

U.S. PATENT DOCUMENTS

| | | | |
|---|---|---|---|
| 5,530,679 A * | 6/1996 | Albertin | G01V 1/301 367/51 |
| 7,725,266 B2 | 5/2010 | Sirgue et al. | |
| 8,345,038 B2 | 1/2013 | Kerofsky | |
| 8,537,638 B2 | 9/2013 | Lee et al. | |
| 2007/0282535 A1 | 12/2007 | Sirgue et al. | |

(Continued)

OTHER PUBLICATIONS

Virieux et al., 'An Overview of Full-waveform inversion in exploration geophysics', Nov. 2009, Research Gate, Geophysics, vol. 74, No. 6, pp. 127-152 (Year: 2009).*

(Continued)

*Primary Examiner* — Elias Desta
(74) *Attorney, Agent, or Firm* — Robert Hsiao (57) ABSTRACT

A method for use in seismic exploration includes: obtaining a diving wave illumination image of a subterranean region from a set of seismic data representative of the subterranean region using a selected acquisition geometry; clipping an inverse of the diving wave illumination image to a range of values; and performing a weighted full-waveform inversion. The weighted full-waveform inversion further includes: weighting a full-waveform inversion gradient with the clipped inverse of the diving wave illumination image; and performing the full-waveform inversion using the weighted gradient.

31 Claims, 5 Drawing Sheets

(56) References Cited

U.S. PATENT DOCUMENTS

2011/0194379 A1    8/2011    Lee et al.
2013/0311151 A1    11/2013    Plessix
2014/0293744 A1    10/2014    Zhang
2016/0187507 A1    6/2016    Brenders et al.
2016/0187512 A1    6/2016    Mothi et al.

OTHER PUBLICATIONS

International Patent Application No. PCT/US2017/064503 International Search Report dated Mar. 27, 2018.
J. Virieux, et al., "An Overview of full-waveform inversion in exploration geophysics", Geophysicics, Society of Exploration Geophysicists, US, vol. 74, No. Suppl. of 6, Nov. 1, 2009, pp. WCCI-WCC26.
Tian Akela, et al., "Applied 3D Full-Waveform Inversion: Increasing the Resolution and Depth Penetration Supervisors: Professor Mike Disclaimer and Declaration", Oct. 1, 2015.
International Patent Application No. PCT/US2017/064503 Search Report dated Jul. 18, 2018.
Antoine Guitton, et al., (2011), "Constrained full-waveform inversion by model reparameterization," Geophysics, vol. 77, No. 2, pp. R117-R127.
Jeroen Tromp, et al., (2005) "Seismic tomography, adjoint methods, time reversal and banana-doughnut kernals," Geophys. J. Int. 160, pp. 195-216.
Colin A. Zelt, (1998), "Lateral velocity resolution from three-dimensional seismic refraction data," Geophys. J. Int., 135, pp. 1101-1112.
Colin A. Zelt, et al., "3D simultaneous seismic refraction and reflection tomography of wide-angle data from the central Chilean margin," Geophysical Research Letters, vol. 26, No. 16, pp. 2577-2580, Aug. 15, 1999.
L. Sirgue, (2006), "The Importance of Low Frequency and Large Offset in Waveform Inversion," presented at the 68th EAGE in Vienna.
Damien Pageot, et al., (2013), "A parametric analysis of two-dimensional elastic full waveform inversion of teleseismic data for lithospheric imaging," Geophys. J. Inc., 193, pp. 1479-1505.
Joanna Morgan, et al., (2013), "Next-generation seismic experiments: wide-angle; multi-azimuth, three-dimensional, full-waveform inversion," Geophys. J. Int., 195, pp. 1657-1678.
D. Baptiste, et al., (2012), "Changing OBC Acquisition Geometry Using FWI Modeling," presented at EAGE in London.
Romain Brossier et al.: "Velocity model building from seismic reflection data by full-waveform inversion: Velocity model building from seismic reflection data," Geophysical Prospecting, vol. 63, No. 2, Nov. 11, 2014, pp. 354-367.
International Patent Application No. PCT/US2017/064506 International Search Report and Written Opinion dated Mar. 15, 2018 (21 pages).
Singapore Search Report and Written Opinion dated Jun. 8, 2020, for Singapore patent application No. 11201907500V, filed Dec. 4, 2017.

* cited by examiner

SEISMIC ACQUISITION GEOMETRY FULL-WAVEFORM INVERSION

CROSS-REFERENCE TO RELATED APPLICATIONS

This application claims priority to U.S. Provisional Patent Application No. 62/429,569, filed Dec. 2, 2016. The disclosure of which is hereby incorporated herein by reference in its entirety.

DESCRIPTION OF THE INVENTION

Field of the Invention

The present invention pertains to imaging of seismic survey information and, more particularly, the efficient operation and usage of computational resources in such imaging.

BACKGROUND OF THE INVENTION

This section of this document introduces selected portions of the art that may be related to various aspects of the present invention described and/or claimed below. It provides background information to facilitate a better understanding of what is claimed. This is therefore a discussion of "related" art. That such art is related in no way implies that it is also "prior art". The related art may or may not be prior art. This discussion is to be read in this light and not as an admission of prior art.

The pursuit of hydrocarbons is frequently performed through "seismic surveying". In seismic surveying, acoustic signals of seismic frequencies are imparted into the earth using impulse sources, swept sources, or still other kinds of energy sources. The energy from these signals propagates through the earth and the structure of the earth's subterranean formation(s) alter(s) the signals and their attributes in characteristic ways. The seismic signals are then returned, in part, to the earth's surface through a variety of mechanisms, such as reflection, refraction, etc. The returned signals are received and recorded as seismic data.

Because of the characteristic ways in which the formations' structures alter the signals and their attributes, the seismic data are representative of the subterranean region through which they propagate. Geophysicists can typically infer the structure of subterranean region from the identified characteristic alterations of the seismic signal. The analysis by which the geophysicists do this is heavily dependent on computational resources. Seismic data sets are sufficiently large to be beyond manual numerical computation and analysis, so geophysicists call on computers for this task. The data sets are also sufficiently large and the processing sufficiently complex that most numerical tasks are also very computationally expensive. That is, it takes a long time using a lot of computing resources.

One aspect of this process is "modeling" the subterranean region being explored or to be explored. It is common to build models representative of the subterranean region from seismic or other data. Sometimes this data has previously been acquired from the subterranean region in the form of, for example, well logs, geological information, geological models, and results from previous seismic processing. Other times this data is synthetic, having been generated in other ways. For example, synthetic data may be obtained from a computer executing numerical algorithms/methods using a model as described above.

The models are usually of various attributes of the subsurface formation, and so may be called "subsurface attribute models". These models are typically representative of a particular physical attribute of the subterranean region. One physical attribute of interest in these types of endeavors is velocity and it is represented in a "velocity model." A velocity model is a representation of the subsurface geological formation that can be used in analysis of seismic data. To convert the seismic data into the "seismic image," geophysicists require an analysis of the subsurface velocities at various locations in the subterranean region. This calculation of the velocity model is also computationally expensive, and its accuracy and precision directly affect the quality of the seismic image.

Another physical attribute of interest in these types of endeavors is the "depth of investigation" ("DOI"). The depth of investigation may be considered to be the depth at which useable information is obtained from a given survey for a given longitudinal and latitudinal coordinate within the subterranean region. It is a function of several well-known parameters such as source and receiver placement, the attributes of the seismic signal, the subsurface velocities, etc.

The locations of the sources and receivers, also known as the "acquisition geometry", and the subsurface structure can greatly impact the depth of investigation for the survey as a whole. The subsurface structure and the interaction of the seismic signal within the subsurface structure can be quite complex. It will also vary by location within the subsurface formation. The depth of investigation therefore is not so much a number as a function of a number of factors that will vary by location within the subterranean region. The depth of investigation is also typically computationally expensive and ambiguous to determine for any given set of seismic data.

One method for used in analyzing seismic data is a full-waveform inversion ("FWI"), which outputs a subsurface attribute model to use in calculating the seismic image. Geophysicists also sometimes perform an analysis of the depth of investigation of the velocity model from FWI—a factor in the depth of investigation and overall accuracy of the seismic image. FWI is computationally expensive, however.

As can be seen from the above discussion, the endeavor is computationally expensive in both time and resources. Significant benefits can therefore accrue in the course of seismic exploration activities by increasing efficiency in operation and usage of computational resources. While there are many techniques suitable for this purpose, the art is always open further advancements. The presently disclosed technique will therefore be well received.

BRIEF DESCRIPTION OF THE DRAWINGS

The accompanying drawings, which are incorporated herein and constitute a part of this specification, illustrate embodiments of the invention and together with the description, serve to explain the principles of the invention. In the figures.

DESCRIPTION OF THE EMBODIMENTS

Subsurface attribute models, such as velocity models, built through full-waveform inversion ("FWI") may be constructed using seismic data with low-frequency, long-offset, diving waves. Since the first iteration of FWI is approximately equal to migration, the present technique approximates the impact of a selected acquisition geometry by calculating a diving wave illumination ("DWI") image volume through migration of low-frequency energy with large opening angles. Through analysis of this DWI image volume, the relative strength of the illumination within the model, decreasing as a function of depth, may be observed. If the FWI is preconditioned by multiplying the FWI gradient with the DWI image volume, the model can be updated only within the strongly illuminated, shallow portions of the model, followed by the weakly illuminated, deeper portions of the model in subsequent iterations. For a selected acquisition geometry, the technique thereby forces FWI to update the model only where the data are most likely to help, mitigating the non-linearity of the problem.

More particularly, the presently disclosed technique uses a DWI image volume as a preconditioner for FWI of seismic data recorded with a particular acquisition geometry. As noted above, subsurface attribute models from FWI are most sensitive to the presence of low-frequency, long-offset, diving wave information recorded in each shot gather. Also as noted above, the first iteration of FWI is approximately equal to migration, and so the impact of a selected acquisition geometry is approximated by running a single iteration of reverse-time migration ("RTM") for each shot location, and stacking for a given geometry as in imaging. By including only the low-frequency, diving wave portion of the wavefield from each shot gather, the FWI depth of investigation ("DOI") can be approximated for a selected acquisition geometry.

The depth of investigation in this context is referred to as the DWI image volume. Through analysis of this DWI image volume, the relative strength of the diving wave illumination in the subsurface attribute model can be observed for a particular acquisition geometry. The illumination is stronger in the shallow part of the model and gets progressively weaker deeper in the section.

Mathematically, FWI updates a subsurface attribute model by calculating a velocity perturbation from the product of a gradient and step-length, and adding this to a starting model. The gradient is calculated for the entire model, but from analyzing the DWI volume, it is known that the depth of investigation of FWI is dependent upon the acquisition geometry used to record the seismic data. To focus the model to update only within the illuminated zone, the presently disclosed technique implements a top-down updating strategy, preconditioning the FWI gradient by multiplying it with the DWI image volume in order to allow the update to apply first to the strongly illuminated, shallow portions of the model, followed by the weakly illuminated, deeper portions of the model.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
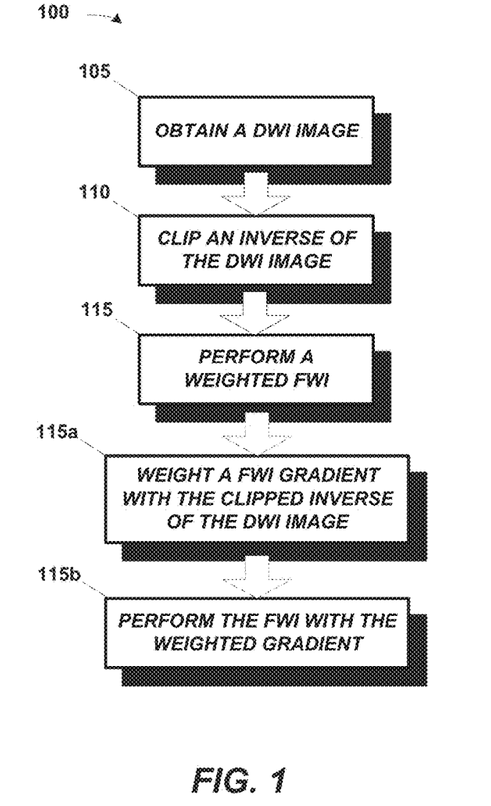
FIG. 1 graphically presents the process flow in the method of the technique disclosed herein.

One particular embodiment of this technique is presented in FIG. 1, which graphically presents the process flow 100 in the method of the technique. The process flow 100 begins by first obtaining (at 105) a DWI image of a subterranean region from a set of seismic data representative of the subterranean region using a selected acquisition geometry. The DWI image may be obtained in any one of several ways. For example, such a DWI image may have previously been generated and archived. In such a situation, the DWI image can be "obtained" by retrieving it from archived storage. In other embodiments, the DWI may be generated from scratch. Any suitable method that becomes apparent to those in the art having the benefit of this disclosure may be used.

However, in order to provide a better understanding of this aspect of the technique, one particular embodiment will now be discussed in further detail. In this particular embodiment, the DWI is generated from data. It is nevertheless to be understood that the process as claimed below is not so limited. Similarly, in this particular embodiment, the subsurface attribute model is a velocity model but models of alternative attributes may be used in alternative embodiments.

Figure 2:
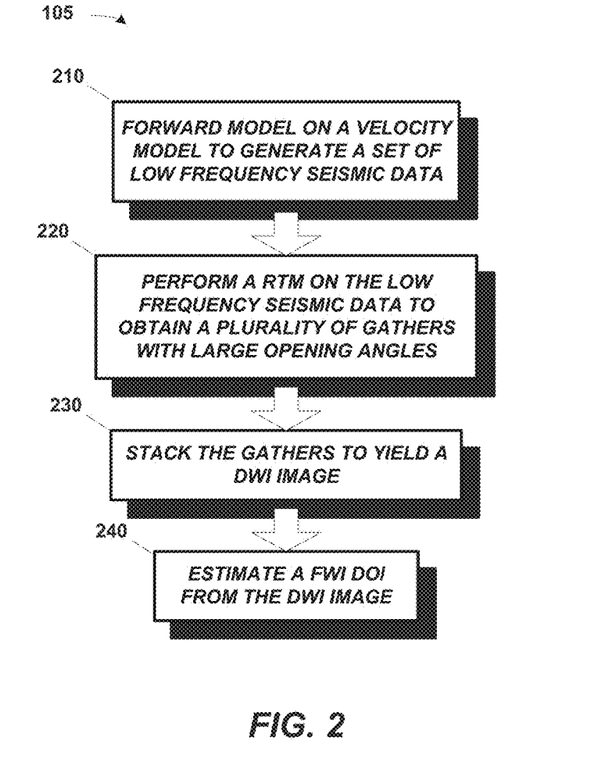
FIG. 2 graphically presents the process flow for obtaining a diving wave illumination image in one particular embodiment of the method of FIG. 1.

A process flow 200 by which a DWI image may be obtained (at 105, FIG. 1) in accordance with one particular embodiment is graphically presented in FIG. 2. As will become apparent to those in the art having the disclosure herein, the process flow is largely, and in some embodiments completely, computer-implemented. To that end, FIG. 3A-FIG. 3B present exemplary computing apparatuses by which the computer-implemented aspects of the process flow 200 may be performed.

Figure 3A:
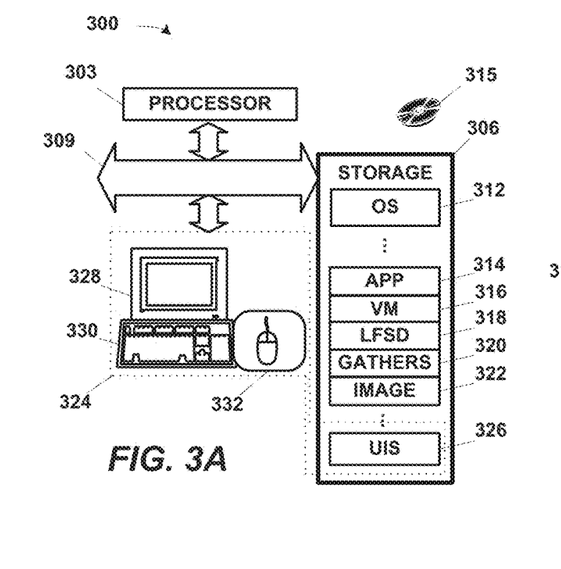
FIG. 3A-FIG. 3B illustrate a computing apparatus that may be used to implement some aspects of the presently disclosed technique.
Figure 3B:
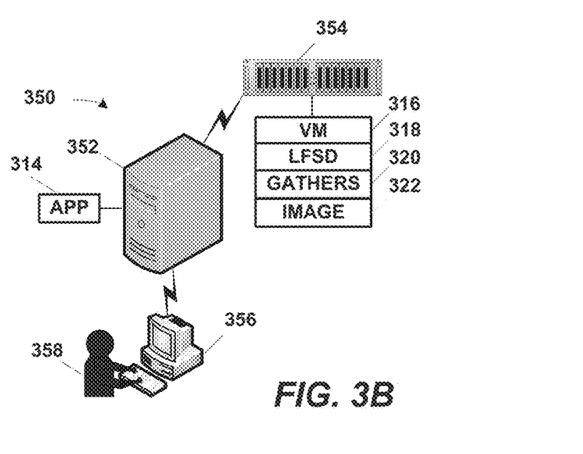

Referring now to FIG. 3A, selected portions of the hardware and software architecture of a computing apparatus 300 are shown. The computing apparatus 300 may be a general purpose computing apparatus or a dedicated computing apparatus depending upon the particular implementation. The computing apparatus 300 includes at least an electronic processor 303 communicating with storage 306 over a communication medium 309.

The electronic processor 303 may be any suitable processor or processor set known to the art. Those in the art will appreciate that data and data sets such as those used In a process such as the one disclosed herein are quite voluminous and that the processing described herein is computationally intensive. Typical implementations for the electronic processor 303 therefore actually constitute multiple electronic processor sets spread across multiple computing apparatuses working in concert. One such embodiment is discussed below.

The storage 306 may include non-transitory storage media such as a magnetic hard disk and/or random access memory ("RAM") and/or removable storage such as an optical disk 315. The storage 306 is encoded with a number of software components including an operating system ("OS") 312; an application 314; a velocity model ("VM") 316, a data structure in which low frequency seismic data ("LFSD") 318 may be stored; a data structure in which a plurality of gathers 320 may be stored; and a data structure in which an image 322 may be stored. The storage 306 may also be distributed across multiple computing apparatuses as described above.

As with the electronic processor 303, implementation-specific design constraints may influence the design of the storage 306 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID.

The electronic processor 303 operates under the control of the OS 312 and executes the application 314 over the communication medium 309. This process may be initiated automatically, for example upon startup, or upon user command. User command may be directly through a user interface 324.

The user interface 324 includes user interface software ("UIS") 326 and a display 328. It may also include peripheral input/output ("I/O") devices such as a keypad or keyboard 330 and a mouse 332. These will be implementation-specific details that are not germane to the presently disclosed technique. For example, some embodiments may forego peripheral I/O devices if the display 328 includes a touch screen. Accordingly, the presently disclosed technique admits wide variation in this aspect of the computing system 300 and any conventional implementation known to the art may be used.

Furthermore, there is no requirement that the functionality of the computing system 300 described above be implemented as disclosed. For example, the application 314 may be implemented in some other kind of software component, such as a daemon or utility. The functionality of the application 314 need not be aggregated into a single software component and may be distributed across two or more software components. Similarly, the data structures may be implemented using any suitable data structure known to the art.

As with the electronic processor 303 and the storage 306, the implementation of the communications medium 309 will vary with the particular embodiment. If the computing system 300 is deployed on a single computing apparatus, the communications medium 309 may be, for example, the bus system of that single computing apparatus. Or, if the computing system 300 is implemented across a plurality of networked computing apparatuses, then the communications medium 309 may include a wired or wireless link between the computing apparatuses.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a hard drive) or optical (e.g., a compact disk read only memory, or "CD ROM"), and may be read only or random access as desired. Similarly, the transmission medium may be twisted wire pairs, coaxial cable, optical fiber, or some other suitable transmission medium known to the art. The invention is not limited by these aspects of any given implementation.

A portion of an exemplary computing system 350 by which such processing occurs in the illustrated embodiment is shown in FIG. 3B. The computing system 350 is networked, but there is no requirement that the computing system 350 be networked. Alternative embodiments may employ, for instance, a peer-to-peer architecture or some hybrid of a peer-to-peer and client/server architecture. The size and geographic scope of the computing system 350 is not material to the practice of the invention. The size and scope may range anywhere from just a few machines of a Local Area Network ("LAN") located in the same room to many hundreds or thousands of machines globally distributed in an enterprise computing system.

The computing system 350 comprises, in the illustrated portion, a server 352, a mass storage device 354, and a workstation 356. Those in the art will furthermore appreciate that the computing system 350, and even that portion of it that is shown, will be much more complex. However, such detail is conventional and shall not be shown or discussed to avoid obscuring the subject matter claimed below.

In FIG. 3B, the application 314 is shown residing on the server 352 while velocity model 316, low frequency seismic data 318, gathers 320, and image 322 reside in the mass storage 354. While this is one way to locate the various software components, the technique is not dependent upon such an arrangement. Although performance concerns may mitigate for certain locations in particular embodiments, the situs of the software components are otherwise immaterial.

The presently disclosed technique admits some variation in the processing depending on the manner of acquisition and implementation specific goals for the end product. Those in the art will appreciate that there will typically be some degree of pre-processing no matter the processing approach. Such pre-processing will typically be used in various embodiments of the presently disclosed technique. However, due to its ubiquity in the art and the familiarity of those in the art with it, such pre-processing will not be discussed further for the sake of clarity and so as to avoid obscuring the subject matter claimed below.

Referring now to FIG. 2 and to FIG. 3B, the user 358 at the workstation 356 invokes the application 314 to perform the process 200. As mentioned above, the velocity model 316 is presumed to have already been generated at the time the user 358 initiates the process 200. The velocity model 316 is a model of a particular subterranean region of the earth that has already been surveyed or that is going to be surveyed. It is generated using techniques well known to the art. In embodiments in which the velocity model 316 has not previously been generated, it can first be generated using those well-known techniques. Those techniques being well-known to the art, further discussion of the details will be omitted for the sake of clarity and so as to avoid obscuring the instant invention.

The velocity model 316 is generated from data (not shown) representative of the subterranean region of the earth. In the illustrated embodiments, that data is seismic data acquired in a previous seismic survey. Alternative embodiments may use other sources of data for this purpose in lieu of or in addition to seismic data if the seismic data if desired. Such other data sources may include, by way of example, well logs, gravity surveys, electromagnetic surveys, geological inspections, etc. Those in the art having the benefit of this disclosure may recognize still further sources of data that may be suitable for this purpose.

With seismic data of sufficiently low frequencies and sufficiently high signal-to-noise, one technique well known to those in the art for constructing a velocity model from seismic data is full-waveform inversion ("FWI"). In an embodiment, FWI begins at low frequencies (as low as possible) and then adds higher and higher frequencies. The subsurface attribute model, of which velocity is one, thereby slowly comes into focus with progressively finer features being added as the rounds of inversion continue. The velocity model output by each stage of the process then becomes the starting model for the next stage. See L. Sirgue & R. G. Pratt, "Efficient Waveform Inversion and Imaging: A Strategy for Selecting Temporal Frequencies", 69 Geophysics 231 (2004).

The velocity model 316 of the illustrated embodiments is furthermore a "smooth" velocity model. In this context, the term "smooth" indicates that the velocity model has been low-pass filtered such that the velocity scale length is greater than the seismic wavelength of the study. However, such smoothing is not necessary to the practice of the invention in all embodiments. Some alternative embodiments may use a velocity model that has not been smoothed.

Returning to FIG. 2 and FIG. 3A, the process 200 begins by forward modeling (at 210) on the velocity model 316 of the subterranean region to generate a set of low frequency seismic data 318. This forward modeling is, more particularly, what is known as "two-way" forward modeling. In other embodiments, the forward modeling may be "one-way" forward modeling, which is generally regarded as less accurate than two-way modeling. In the present embodiment, however, references to forward modeling are describing two-way modeling. The general concept of two-way forward modeling on a velocity model is, in itself, well known to the art. However, there are at least two distinctions in the present invention from the conventional practice.

One distinction is that the forward modeling (at 210) is performed selectively with one or more particular acquisition geometries—or locations of sources and receivers. The selection of the acquisition geometry will depend upon the embodiment as the FWI DOI is dependent upon the acquisition geometry. Some embodiments may estimate an FWI DOI for a seismic survey that has already been performed. These embodiments will use the actual acquisition geometry deployed during the acquisition. The process may also be used to estimate a DOI for a proposed survey. In such embodiments, several proposed acquisition geometries may be used to determine which yields the best FWI DOI for the subterranean region of interest.

A second distinction is that the emulated seismic signals used in the forward modeling (at 210) will be tailored to produce low frequency seismic data. Those in the art will appreciate that a seismic survey, or the forward modeling of one, will typically include a range of frequencies in the resultant seismic data. For example, one embodiment uses a range of frequencies spanning three octaves, up to frequencies of interest that are capable of resolving subsurface structures at tens of meters resolution. Those in the art will also appreciate that forward modeling is computationally expensive, and restricting the forward modelling to low frequency seismic data will speed up the forward modelling process. The presently claimed process operates on low frequency seismic data, and so the seismic signals used in the forward modeling (at 210) may accordingly be tailored, reducing the overall computational cost of the forward modelling (at 210).

Within the context of the present disclosure, the term "low frequency" generally means 2 Hz-6 Hz. In theory, the claimed process may use lower than 2 Hz. However, due to recognized geophysical limitations and instrumentation issues seismic sources in the field rarely go lower than 2 Hz. The claimed process may use frequencies higher than 6 Hz, but the estimated FWI DOI is limited by this frequency and the higher the frequency, generally the shallower the estimated FWI DOI.

There consequently may be unusual circumstances where the "low frequency" of the modeled seismic data falls outside the range of 2 Hz-6 Hz. For example, the seismic data may be known to be particularly free of noise so that frequencies lower than 2 Hz may be used. Similarly, technology may advance to the point where seismic frequencies less than 2 Hz are readily achievable in the field. Or, one might be testing for a particularly shallow FWI DOI, in which case frequencies higher than 6 Hz might be used. However, it is anticipated that most embodiments will employ "low frequencies" in the range of 2 Hz-6 Hz.

Either way, in the context of "low frequencies" the term "approximately" means that the numerical quantification is within the margin of error acceptable within the industry. For example, it is well known that during the course of a survey instrument settings and measurements may vary for a variety of reasons. Thus, a frequency of "approximately 2 Hz" includes frequencies that are not precisely 2.0 Hz but includes frequencies that vary slightly within acceptable margins of error. Similarly, a frequency range of approximately 2 Hz-6 Hz" may include frequencies outside the range of 2.0 Hz-6.0 Hz provided they are within acceptable margins of error. What constitutes an "acceptable margin of error" will depend on circumstance readily apparent to those skilled in the art having the benefit of this disclosure.

The claimed process is independent of the type of modeled sources and the signals they impart. The emulated sources may be impulse sources, swept sources, or any other kind of source known to the art. As those in the art having the benefit of this disclosure will appreciate, each of these kinds of modeled sources will produce a different kind of signal. The claimed process may be used with each of them.

Returning to FIG. 1, the process 100 continues by performing (at 220) a reverse time migration on the low frequency seismic data yielded by the forward modeling (at 210). The object of this reverse time migration is to obtain (at 220) a plurality of image gathers with large opening angles. Reverse time migration is, in itself, well known to the art although its use in this context is not. It is anticipated that embodiments of the claimed process will use reverse time migration techniques that discriminate between gathers with large opening angles and those that do not. One such technique is disclosed in U.S. Patent Publication 2014/0293744, entitled, "Specular Filter (SF) and Dip Oriented Partial Imaging (DOPI) Seismic Migration", filed Mar. 31, 2014, in the name of the inventor Qie Zhang and commonly assigned herewith.

Figure 4:
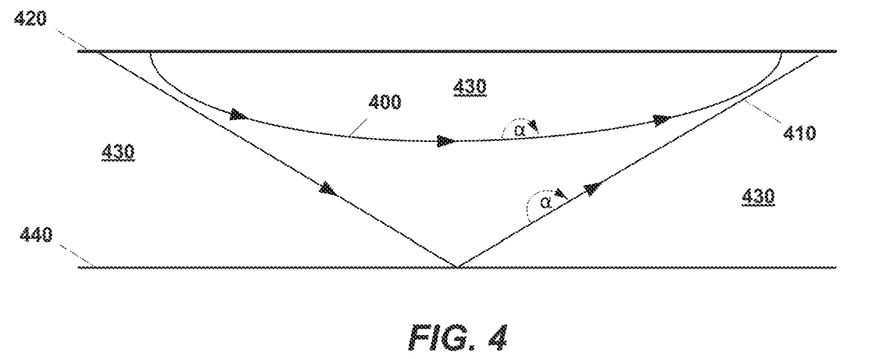
FIG. 4 presents some concepts associated with the acquisition of a diving wave illumination image in the context of an exemplary seismic survey.
Figure 5:
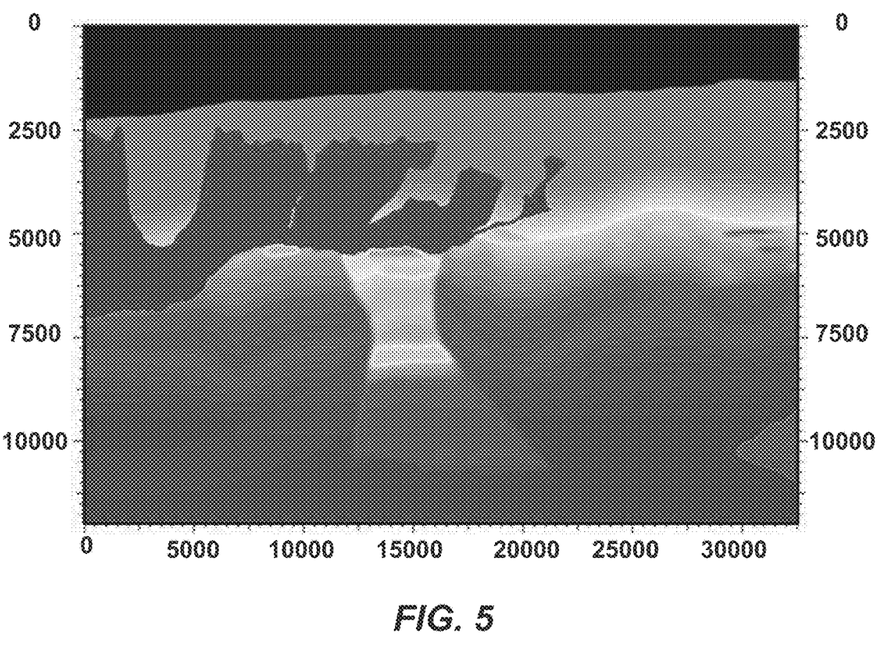
FIG. 5 is a graphical rendering of an exemplary velocity model as may be used in some embodiments of the present invention.

Within the context of this disclosure, "large opening angles" means those that equal or exceed approximately 160°. This will typically include, as shown in FIG. 4, what are known to the art as "diving waves" 400 and backscattered energy 410. Diving waves 400 are those waves that are refracted rather than reflected to the earth's recording surface 420. Changes in the seismic velocity characteristic of the subterranean formation 430 gradually change the direction of propagation for the energy to redirect it from a downward trajectory to an upward one. The opening angle is equal to 180° along the path of the diving waves. The backscattered energy 410 results from reflection at a reflector 440 in the subterranean formation 430. The opening angle along the backscattered wave path 410 has an opening angle of 180°.

In this context, "approximately" means that the precise measurement for what constitutes a "large opening angle" may vary to some degree depending upon the accuracy of the reverse time migration algorithm. In this circumstance, one might relax the standard of ≥160° to include that substantial amount of energy that is close to the angle even if not exactly what is desired. Thus, some embodiments may relax the standard in order to capture that energy. Those in the art having the benefit of the disclosure herein will be able to readily exercise such personal judgment in implementing the claimed process.

As noted above, it is contemplated that most embodiments will utilize reverse time migration ("RTM") techniques that will discriminate for and yield gathers with large opening angles. Reverse time migration is an example of wavefield-based migration, where wavefields are generated and used to form a seismic image by forward modeling a wavefield (or source wavefield), back-propagating a set of recorded seismic data using the same forward modeling engine (the receiver wavefield), and application of an imaging condition, such as a zero lag cross-correlation between the source and receiver wavefields. Wavefield-based migration methods are generally considered desirable in a subterranean region that is geologically complex and contains steeply dipping geological structures. Though computationally more expensive than ray-based migration, RTM produces a more accurate seismic image.

Returning to FIG. 2, the process 200 then continues by stacking (at 230) the image gathers with large opening angles to yield a diving wave illumination image. Note that the diving wave illumination image contains not only the diving waves, but also the backscattered energy whose opening angles are ≥160° as discussed above. Stacking itself is well known in the art, although its use in this context is not. It comprises a summation of the gathers to generate the diving wave illumination image.

The process 200 then concludes by estimating (at 240) a full-waveform inversion depth of investigation ("DOI") from the diving wave illumination image. This will typically include rendering the diving wave illumination image for visual inspection. Those in the art will appreciate that the DOI is not a number, but is rather a function. Typically, the user would like to evaluate if the FWI DOI for a given seismic acquisition is sufficient to investigate the area of interest in the subsurface. Those in the art having the benefit of this disclosure will be able to judge the answer to this inquiry from visual inspection of the diving wave illumination image. However, some embodiments may choose to implement this step with computing technology.

More specifically, this particular embodiment generates forward model data only at frequencies lower than 6 Hz and calculates a reverse time migration ("RTM") image with only the portion of angle gathers with large opening angles ≥160°. That is, this embodiment includes only data in the RTM which satisfies the opening angle imaging condition that approximates that for diving waves. (Note that this will include not only diving waves, but also some backscattered energy as discussed above.) It discriminates these large angles by calculating the angle gathers in RTM using the optical flow method disclosed in the aforementioned U.S. Patent Publication 2014/0293744. For a selected acquisition geometry, the corresponding stack of these low frequency, large angle gathers is termed the Diving Wave illumination ("DWI") image, which approximates the DOI of FWI for this same acquisition geometry.

Figure 6:
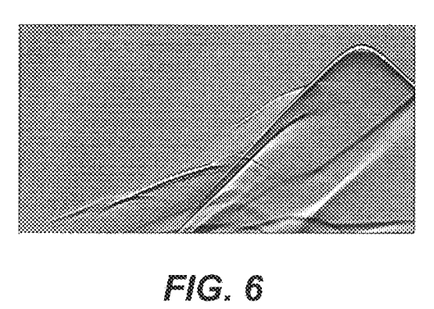
FIG. 6 is a graphical rendering of synthetic forward modelled, low frequency data obtained from the velocity model of FIG. 5.
Figure 7:
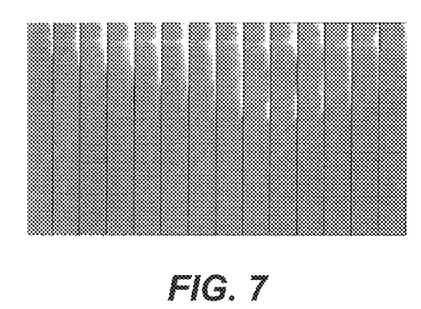
FIG. 7 is a graphical rendering of angle gathers obtained by reverse time migration of the low frequency data of FIG. 6. The opening angles of the gather increases from left to right within a panel.
Figure 8A:
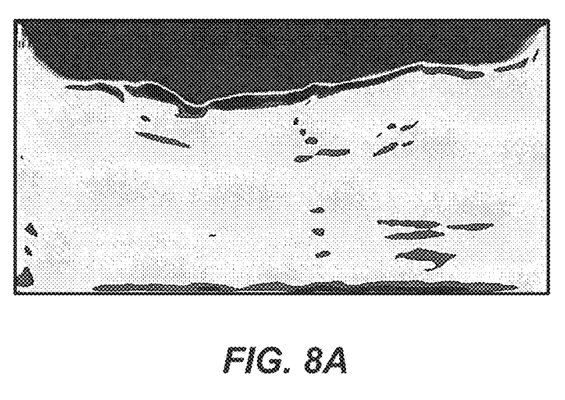
FIG. 8A-FIG. 8C are graphical renderings of diving wave illuminations obtained from the large angle gathers of FIG. 7 for maximum offsets of 8 km, 12 km, and 15 km respectively.
Figure 8B:
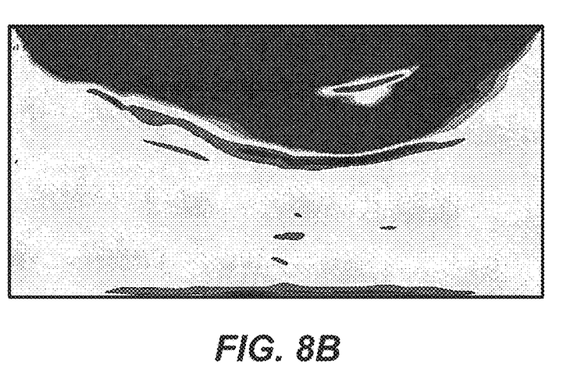
Figure 8C:
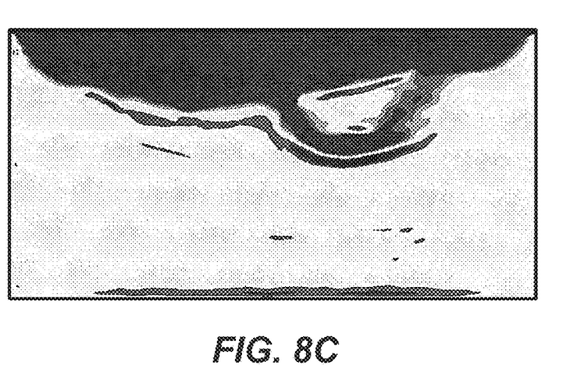

Essentially, in this embodiment there is a three step process to obtain the DWI image as illustrated in FIG. 2. It begins by forward modeling (at 210) on a smooth velocity model to generate low-frequency (2-6 Hz) data, such as that shown in FIG. 6. It proceeds by running (at 220) low-frequency RTM (2-6 Hz), including calculating angle gathers by the optical flow technique disclosed above. FIG. 7 is a graphical rendering of angle gathers obtained by reverse time migration of the low frequency data of FIG. 6 in this embodiment. It then generates a stack (at 230) of the portion of the angle gathers with large opening angles. This stack is the DWI Image, which approximates the FWI DOI for a selected acquisition geometry. FIG. 8A-FIG. 8C are graphical renderings of diving wave illumination images obtained from the large angle gathers of FIG. 7 for maximum offsets of 8 km, 12 km, and 15 km respectively.

Returning now to FIG. 1, once the DWI image has been obtained (at 105), the process 100 continues by clipping an inverse of the previously obtained DWI image (at 110). Although the DWI image is unknown to the art, both inverting and clipping an image such as a DWI image are known in other contexts. Clipping an image may also be described as thresholding at a selected amplitude value. Those inverting and clipping techniques are readily applicable to the DWI image and any such suitable technique may be employed. In the illustrated embodiment, the inverted DWI image is clipped to values between 1 and 0.

This is followed by performing a weighted FWI (at 115). The weighted FWI includes weighting the FWI gradient (at 115*a*) with the clipped inverse of the DWI image. In the illustrated embodiment, this is done through multiplication—the FWI gradient is multiplied by the clipped inverse of the DWI image. The clipping process limits the inverse DWI image to that portion within the DOI.

The inverting and clipping (at 110) yields a "weight" with which an FWI iteration may be preconditioned for the selected geometry of the original DWI image. More particularly, it is the FWI gradient that is preconditioned (at 115*a*) and the weighting of the FWI gradient (at 115*a*) therefore preconditions the FWI as a whole. Because the clipped, inverted image is obtained from DWI image and because that DWI image is a function of the selected geometry, the FWI is preconditioned by the selected geometry.

Figure 9:
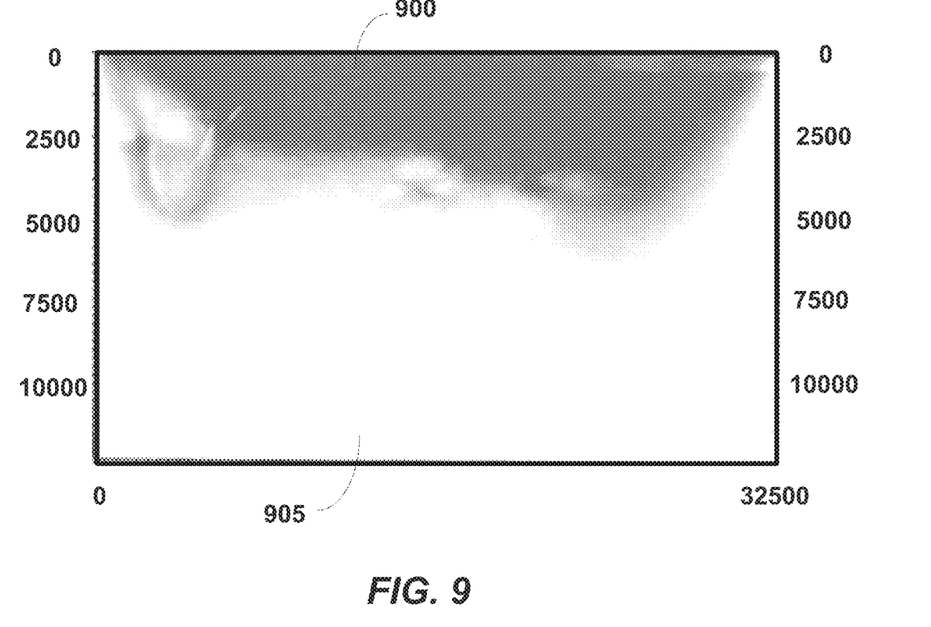
FIG. 9 depicts one particular embodiment of a DWI image volume.
Figure 10:
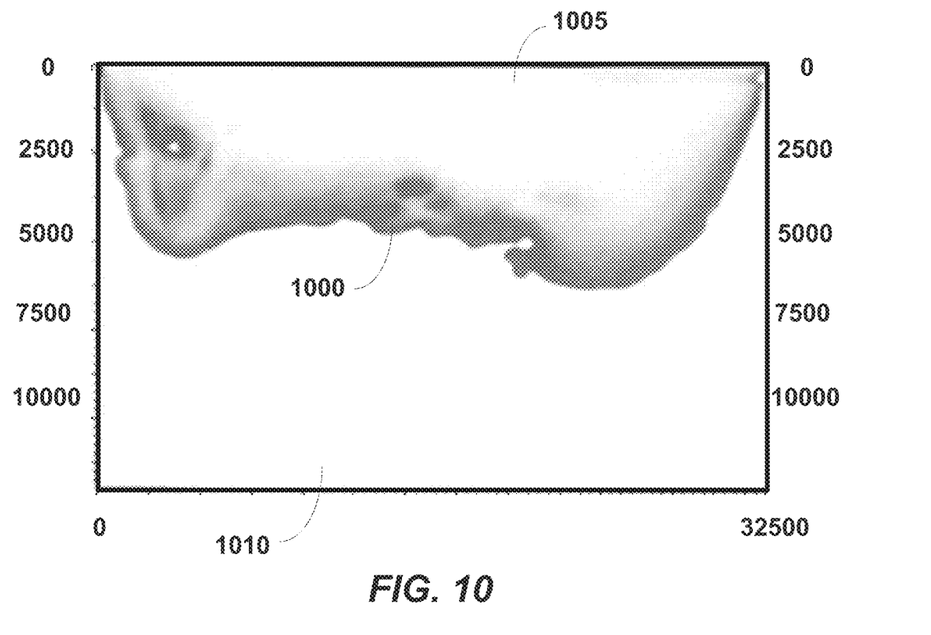
FIG. 10 depicts an FWI gradient preconditioned with the DWI volume of FIG. 9.

The effect of weighting the FWI gradient (at 115*a*) as described above is to limit the amount of information available for the FWI. FIG. 9 depicts one particular embodiment of a DWI image volume. The darker areas 900 indicate areas within the DOI and the lighter areas 905 indicate areas outside the DOI. FIG. 10 depicts a preconditioned FWI gradient 1000 derived from the DWI volume of FIG. 9. The area 1005 within the FWI gradient contains information useful in the FWI. The area 1010 contains no information, and is not useful in the FWI.

Thus, when the FWI is performed (at 115*b*) with the weighted gradient, the FWI need only be performed on those parts of the model corresponding to the area 1005 within the weighted gradient. This, in turn, conserves computing resources by updating only a portion of the model. However, that portion of the model that is updated is that portion in the strongly weighted areas within the DOI, and therefore within the areas of most interest.

The process of performing the weighted FWI (at 115) is then iterated as desired. In each iteration, however, the inverse of the DWI is clipped using different values so that the result is to create a clipped inverse of the DWI image that contains information in deeper portions of the model. The weighted FWI gradient for each iteration therefore contains more information for updating the model to greater depths. This gradually pushes each iteration to update the deeper, more weakly illuminated parts of the velocity model. The areas of the model within the DOI, and thus are more strongly illuminated, are therefore updated and refined to a higher degree than those areas that are more weakly illuminated.

The disclosed technique therefore, essentially, can be considered a four-step, iterative process in the illustrated embodiment. For a selected acquisition geometry, first obtain a DWI image volume. Then, clip the inverse of the DWI volume to values between 1 and 0, with higher values representing stronger diving-wave illumination. This is followed by performing an FWI with field data acquired using the same acquisition geometry used to calculate the DWI volume, multiplying the FWI gradient by this weighted volume to emphasize the model to update within the strongly illuminated portion of the velocity model. Then, the clipping and weighted FWI are repeated as desired, changing the clip values to force FWI to update the deeper, more weakly illuminated parts of the velocity model.

Figure 11A:
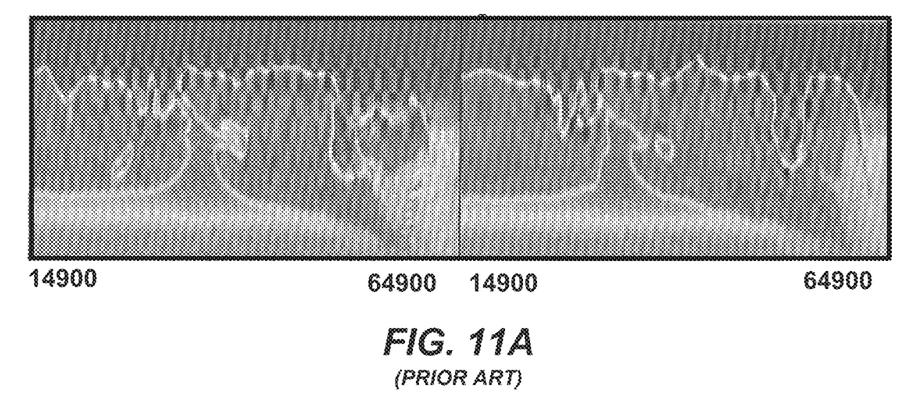
FIG. 11A-FIG. 11B are updated checkerboard perturbations using a conventional FWI workflow and a DWI preconditioned FWI gradient in accordance with the presently disclosed technique, respectively, each drawing depicting two slices of the image volume.
Figure 11B:
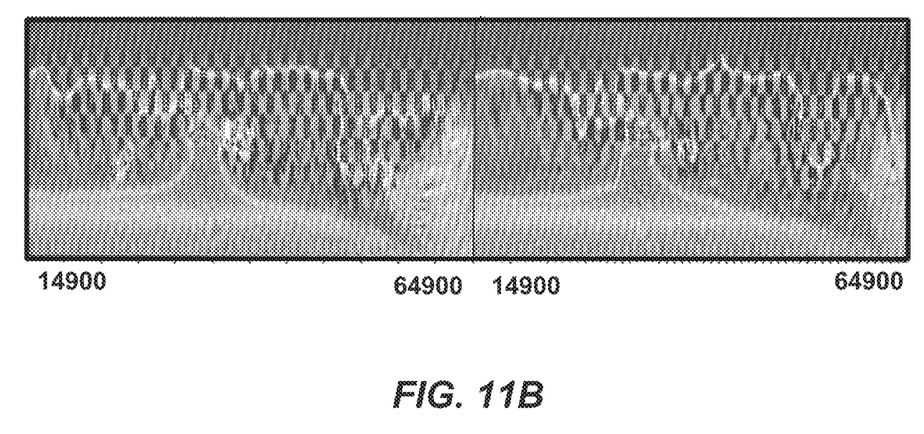

The efficacy of the disclosed technique can be demonstrated through FIG. 11A-FIG. 11B. FIG. 11A is an updated checkerboard perturbation using a conventional FWI workflow depicting two slices of the image volume. FIG. 11B is an updated checkerboard perturbation using a DWI preconditioned FWI gradient in accordance with the presently disclosed technique depicting the same two slices of the image volume. Those skilled in the art with knowledge of how to read these drawings will observe that the updated checkerboard perturbation of FIG. 11B is much improved over that of FIG. 11A.

The technique disclosed herein therefore improves the usage and efficiency of computational resources by weighting the FWI to precondition it for the selected geometry of an acquisition. This weighting causes the FWI to focus on the areas of the subterranean formation most strongly illuminated during the survey by limiting earlier iterations to such areas and then expanding to more weakly illuminated area in subsequent iterations. Notably, the areas most strongly illuminated during the acquisition benefit from the full number of iterations such that no meaningful degradation occurs in the end product as a result of the weighting. Indeed, as shown by FIG. 11A-FIG. 11B, the disclosed technique in some ways at least yields a superior end product.

Still other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for use in seismic exploration, comprising:
   obtaining a diving wave illumination image of a subterranean region from a set of seismic data representative of the subterranean region using a selected acquisition geometry in response to performing a reverse time migration on low frequency seismic data, wherein the selected acquisition geometry describes a location of a source and a location of a receiver;
   clipping an inverse of the diving wave illumination image to a range of values;
   performing a weighted full-waveform inversion on a subsurface attribute model of the subterranean region, including:
      weighting a full-waveform inversion gradient with the clipped inverse of the diving wave illumination image by multiplying the full-waveform inversion gradient by the clipped inverse of the diving wave illumination image; and
      performing the full-waveform inversion on parts of the subsurface attribute model corresponding to an area associated with the weighted gradient.

2. The process of claim 1, wherein obtaining the diving wave illumination image includes retrieving a legacy diving wave illumination image from storage.

3. The process of claim 1, wherein obtaining the diving wave illumination image includes:
   forward modeling on the subsurface attribute model to generate a set of synthetic, the low frequency seismic data, the subsurface attribute model being generated from the data representative of the subterranean region;
   performing the reverse time migration on the low frequency seismic data to obtain a plurality of gathers with large opening angles; and
   stacking the gathers to yield the diving wave illumination image.

4. The process of claim 3, wherein the subsurface attribute model is a smooth subsurface attribute model.

5. The process of claim 3, wherein the low frequency seismic data are acquired by performing an acquisition between approximately 2 Hz-6 Hz.

6. The process of claim 3, wherein the large opening angles comprise angles greater than approximately 160°.

7. The process of claim 3, wherein the subsurface attribute model comprises a velocity model.

8. The process of claim 3, wherein the subsurface attribute model is obtained from a set of seismic data.

9. The process of claim 1, further comprising clipping and weighted full-waveform inversion using a second range of values.

10. The process of claim 1, wherein clipping the inverse of the diving wave illumination image to the range of values includes clipping the inverse of the diving wave illumination image to a range of values between 0 and 1.

11. The process of claim 1, wherein performing the weighted full-waveform inversion includes performing a weighted full-waveform inversion with seismic data acquired from the subterranean region using the selected acquisition geometry.

12. The process of claim 1, wherein performing the weighted full-waveform inversion includes performing a weighted full-waveform inversion with synthetic seismic data acquired from a subsurface attribute model of the subterranean region using the selected acquisition geometry.

13. A process for use in seismic exploration, comprising:
objectively quantifying a depth of investigation in a subterranean region for a selected acquisition geometry, wherein the selected acquisition geometry describes a location of a source and a location of a receiver;
updating a subsurface attribute model for the subterranean region up to the objectively quantified depth of investigation, including:
obtaining a diving wave illumination image of the subterranean region from a set of seismic data representative of the subterranean region using the selected acquisition geometry in response to performing a reverse time migration on low frequency seismic data;
clipping an inverse of the diving wave illumination image to a range of values;
weighting a full-waveform inversion gradient with the clipped inverse of the diving wave illumination image by multiplying the full-waveform inversion gradient by the clipped inverse of the diving wave illumination image; and
performing a full-waveform inversion on parts of the subsurface attribute model corresponding to an area associated with the weighted gradient; and iteratively performing subsequent weighted full-waveform inversions using differently weighted full-waveform inversion gradients to update the subsurface attribute model to depths deeper than the depth of investigation.

14. The process of claim 13, further comprising:
forward modeling on the subsurface attribute model to generate a set of synthetic, the low frequency seismic data, the subsurface attribute model being generated from the data representative of the subterranean region;
performing the reverse time migration on the low frequency seismic data to obtain a plurality of gathers with large opening angles; and
stacking the gathers to yield the diving wave illumination image.

15. The process of claim 14, wherein the subsurface attribute model is a smooth subsurface attribute model.

16. The process of claim 14, wherein the low frequency seismic data are acquired by performing an acquisition between approximately 2 Hz-6 Hz.

17. The process of claim 14, wherein the large opening angles comprise angles greater than approximately 160°.

18. A method for use in seismic exploration, comprising:
obtaining a given acquisition geometry, wherein the given acquisition geometry is describes a location of a source and a location of a receiver;
preconditioning a full-waveform inversion on a subsurface attribute model of a subterranean region using the given acquisition geometry by:
obtaining a diving wave illumination image of the subterranean region from a set of seismic data representative of the subterranean region using the given acquisition geometry in response to performing a reverse time migration on low frequency seismic data;
clipping an inverse of the diving wave illumination image to a range of values; and
weighting a full-waveform inversion gradient with the clipped inverse of the diving wave illumination image by multiplying the full-waveform inversion gradient by the clipped inverse of the diving wave illumination image; and
performing the preconditioned full-waveform inversion on parts of the subsurface model corresponding to an area associated with the weighted gradient.

19. The method of claim 18, wherein preconditioning the full-waveform inversion includes:
objectively quantifying a depth of investigation for the subsurface attribute model using the given acquisition.

20. A process for use in seismic exploration, comprising:
obtaining a diving wave illumination image of a subterranean region from a set of seismic data representative of the subterranean region using a selected acquisition geometry in response to performing a reverse time migration on low frequency seismic data, wherein the selected acquisition geometry describes a location of a source and a location of a receiver;
clipping an inverse of the diving wave illumination image to a range of values;
performing a weighted full-waveform inversion on a subsurface attribute model of the subterranean region, including:
weighting a full-waveform inversion gradient with the clipped inverse of the diving wave illumination image by multiplying the full-waveform inversion gradient by the clipped inverse of the diving wave illumination image; and
performing the full-waveform inversion on parts of the subsurface attribute model corresponding to an area associated with the weighted gradient; and
iteratively performing subsequent weighted full-waveform inversions using differently weighted full-waveform inversion gradients to update the subsurface attribute model to depths deeper than the depth of investigation.

21. The process of claim 20, wherein obtaining the diving wave illumination image includes:
forward modeling on the subsurface attribute model to generate a set of synthetic, the low frequency seismic data, the subsurface attribute model being generated from the data representative of the subterranean region;
performing the reverse time migration on the low frequency seismic data to obtain a plurality of gathers with large opening angles; and stacking the gathers to yield the diving wave illumination image.

22. The process of claim 21, wherein the subsurface attribute model is a smooth subsurface attribute model.

23. The process of claim 21, wherein the low frequency seismic data are acquired by performing an acquisition between approximately 2 Hz-6 Hz.

24. The process of claim 21, wherein the large opening angles comprise angles greater than approximately 160°.

25. The process of claim 20, wherein clipping the inverse of the diving wave illumination image to the range of values includes clipping the inverse of the diving wave illumination image to a range of values between 0 and 1.

26. An apparatus, comprising:
    a storage;
    a communication medium;
    a processor communicating with the storage over the communication medium;
    a set of seismic data residing on the storage, the seismic data being representative of a subterranean region and obtained using a selected acquisition geometry, wherein the selected acquisition geometry describes a location of a source and a location of a receiver;
    a software component residing on the storage that, when executed by the processor, performs a process for use in seismic exploration, comprising:
        obtaining a diving wave illumination image of a subterranean region from the set of seismic data in response to performing a reverse time migration on low frequency seismic data;
        clipping an inverse of the diving wave illumination image to a range of values;
        performing a weighted full-waveform inversion on a subsurface attribute model of the subterranean region, including:
            weighting a full-waveform inversion gradient with the clipped inverse of the diving wave illumination image by multiplying the full-waveform inversion gradient by the clipped inverse of the diving wave illumination image; and
            performing the full-waveform inversion on parts of the subsurface attribute model corresponding to an area associated with the weighted gradient.

27. The apparatus of claim 26, wherein obtaining the diving wave illumination image includes:
    forward modeling on the subsurface attribute model to generate a set of synthetic, the low frequency seismic data, the subsurface attribute model being generated from the data representative of the subterranean region;
    performing the reverse time migration on the low frequency seismic data to obtain a plurality of gathers with large opening angles; and
    stacking the gathers to yield the diving wave illumination image.

28. The apparatus of claim 27, wherein the subsurface attribute model is a smooth subsurface attribute model.

29. The apparatus of claim 27, wherein the low frequency seismic data are acquired by performing an acquisition between approximately 2 Hz-6 Hz.

30. The apparatus of claim 27, wherein the large opening angles comprise angles greater than approximately 160°.

31. The apparatus of claim 26, wherein clipping the inverse of the diving wave illumination image to the range of values includes clipping the inverse of the diving wave illumination image to a range of values between 0 and 1.

\* \* \* \* \*